(12) United States Patent
Jibb et al.

(10) Patent No.: US 7,854,236 B2
(45) Date of Patent: Dec. 21, 2010

(54) VACUUM INSULATED PIPING ASSEMBLY METHOD

(75) Inventors: Richard John Jibb, Amherst, NY (US); Wevone C. Hobbs, Cadiz, OH (US); Robert W. Fix, Cortland, IL (US); Michael T. Marshall, Dover, OH (US); Susan Renee Kelley, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 843 days.

(21) Appl. No.: 11/820,442

(22) Filed: Jun. 19, 2007

(65) Prior Publication Data

US 2008/0314455 A1 Dec. 25, 2008

(51) Int. Cl.
*F17D 1/00* (2006.01)
(52) U.S. Cl. .................. 137/15.11; 137/375; 138/114; 138/149; 285/47
(58) Field of Classification Search .............. 137/15.11, 137/375, 312; 138/149, 114; 185/47, 53
See application file for complete search history.

(56) References Cited

U.S. PATENT DOCUMENTS

| | | | |
|---|---|---|---|
| 3,250,297 A | 5/1966 | Mooneyham | |
| 3,344,803 A | 10/1967 | Charles et al. | |
| 4,515,397 A | 5/1985 | Nowobilski et al. | |
| 5,084,313 A * | 1/1992 | Missig et al. | 428/35.8 |
| 6,216,745 B1 | 4/2001 | Augustynowicz et al. | |
| 6,257,282 B1 | 7/2001 | Emmer et al. | |
| 6,695,358 B2 | 2/2004 | Bonn | |
| 7,066,497 B2 * | 6/2006 | Fullbeck et al. | 285/256 |
| 7,305,837 B2 * | 12/2007 | White | 62/50.7 |
| 7,562,534 B2 * | 7/2009 | Jibb et al. | 62/50.7 |
| 2006/0054234 A1 | 3/2006 | White | |

* cited by examiner

*Primary Examiner*—Kevin L Lee
(74) *Attorney, Agent, or Firm*—David M. Rosenblum

(57) ABSTRACT

Method of assembling a vacuum insulated piping run for conducting a cryogenic fluid in which piping sections are produced in a first location and then assembled in a second location into a piping run. Each of the piping sections incorporates an outer cylindrical casing and an inner pipe for transport of the cryogenic fluid to form an inner annular region for containing insulation that can be radiation shield insulation and aerogel blankets. The piping sections are joined by welding the ends of the inner pipes together and then joining the outer cylindrical casing by a shell-like section. Points of connections are tested by vacuum testing techniques as each of the connections is made. Thereafter, the annular region is purged with a condensable gas such as carbon dioxide and subjected to a subatmospheric pressure.

14 Claims, 2 Drawing Sheets

VACUUM INSULATED PIPING ASSEMBLY METHOD

FIELD OF THE INVENTION

The present invention relates to a method of assembling a vacuum insulated piping run for conducting a cryogenic fluid. More particularly, the present invention relates to such a method in which piping sections are fabricated in a first location and then assembled in a second location and during the assembly, connections between the piping sections are tested by vacuum leak testing and the completed piping sections are subjected to a subatmospheric pressure.

BACKGROUND OF THE INVENTION

Vacuum insulating piping is employed for transport of cryogenic fluids within industrial facilities such as air separation plants. Typically, vacuum insulated piping consists of a concentric arrangement of outer and inner pipes with vacuum insulation provided between the pipes. The outer pipe serves as a casing to contain the vacuum insulation and the inner pipe while the inner pipe serves to conduct the cryogenic fluids.

The outer casing also serves to contain a vacuum within the insulation to allow the insulation to properly function. Typically, this vacuum is ten microns of mercury or less, and preferably 1 micron of mercury or less. Since piping sections can only be practically shipped at between about 20 and 30 feet, the piping sections are fabricated in a first location such as a factory where vacuum is applied to the insulation space between the outer casing and the inner pipe. The piping sections are then joined in the field with the use of couplings between the piping sections.

U.S. Pat. No. 4,515,397 discloses a vacuum insulated conduit having inner and outer pipes and insulation between the pipes in which the vacuum is applied to each section during the fabrication. End sections of the inner pipe project from opposite ends of the piping sections to allow the piping sections to be joined at their inner pipes in the field. Insulated couplings around the juncture of the pipes and a bellows-like arrangement provided at the ends of the pipes inhibit heat leakage at the junctions.

U.S. Pat. No. 6,695,358 discloses a male-female bayonet or pipe spool connector that is used in connection with the coupling of vacuum insulated piping sections. Each of the piping sections has a pump out valve to allow evacuation of each of the sections and ports with rupture disks to prevent destruction of the piping section upon failure of the inner pipe.

U.S. Pat. No. 6,216,745 again utilizes prefabricated piping sections to which a vacuum has been applied in which the outer casing or pipe is connected to the inner pipe by way of a bellows. Each section can be evacuated from a cap port in the field. Additionally, since the piping sections are joined, a clam-shell arrangement may be secured together in the field and then filled with an insulation. A similar arrangement is disclosed in U.S. Pat. No. 6,257,282 in which vacuum-like sleeves are applied to the juncture between pipes.

U.S. Patent Application 2006/0054234 discloses a cryogenic piping system that is formed within an insulation jacket that is a continuous conduit to form a single insulation space about an inner pipe along the length of the inner pipe which is also continuous. The insulation volume is evacuated by a vacuum pump to a moderate vacuum and thereafter is filled with a high purity condensable gas, for example carbon dioxide. Thereafter, the insulation volume is evacuated to a moderate vacuum. During operation of the piping system any remaining condensable gas is cooled and condensed by flowing cryogenic liquid within the pipe volume to act to further lower the pressure within the piping system.

The disadvantage of all of the prior art patents in which the separate piping sections are separately evacuated is that the valves and ports provided for such purposes present individual sites at which failure can occur. Moreover, separately forming the piping sections in a manner in which each of the sections is to maintain a vacuum adds to the fabrication costs of the sections. Additionally, complex connections between the sections such as separate insulated couplings and bayonet arrangements also add to the fabrication costs. With respect to U.S. Patent Application 2006/005423, although it is not discussed in this patent that the same could be made by forming the piping system in separate sections and fabricating the system in the field, nevertheless if this were somehow done, there would be no provision for ensuring that the connections between the sections would be free of defects from which the maintenance of vacuum would be lost.

As will be discussed, the present invention discloses a method of assembly vacuum insulated piping that overcomes many of the disadvantages of the prior art by allowing sections to be connected in an inexpensive and highly simplified manner as compared to the prior art, that does not have multiple service points for applying vacuum and yet allows the connections between sections to be tested for integrity during the field installation of the completed piping run.

SUMMARY OF THE INVENTION

The present invention provides a method of assembling a vacuum insulated piping run for conducting a cryogenic fluid. In this regard, the term "cryogenic fluid" includes all fluids that are normally in a gaseous state under conditions of standard atmospheric temperature and pressure. Examples include atmospheric gases such as oxygen, nitrogen, carbon dioxide and argon as well as liquefied natural gas and other hydrocarbon containing mixtures.

In accordance with the method, piping sections are produced in a first location. The piping sections have a concentric arrangement of outer cylindrical casings, inner pipes to conduct the cryogenic fluid and insulation material located between the outer cylindrical casings and the inner pipes. The piping sections are transported from the first location to a second location where the piping sections are assembled into the vacuum insulated piping run. This is accomplished by joining the ends of the inner pipes and connecting shell-like sections to the outer cylindrical casings at junctures of the inner pipes.

The junctures of the inner pipes and the connections of the shell-like sections are helium leak tested such that at least a helium leak test is performed to determine the integrity of at least each of the junctures after forming each of the junctures. Additionally, at least each of the connections is helium leak tested by temporarily sealing an inner annular region located between the outer cylindrical casings and the inner pipes and containing the insulation materials. Thereafter, the inner annular region is evacuated through at least one opening formed in at least one of the outer cylindrical casings such that a plurality of the junctures and connections can be helium leak tested with the use of the at least one opening. A helium tracer gas is then introduced to each of the connections to be helium leak tested and an outlet stream evacuated through the at least one opening is tested for presence of the helium tracer gas. Preferably, each of the junctures can be tested by introducing the helium tracer gas into the inner pipes and also testing the outlet stream evacuated through the at least one opening for presence of the helium tracer gas.

After the vacuum insulated piping run is assembled, a condensable gas is introduced into the vacuum insulated piping run, within the inner annular region, through the at least one opening. Thereafter, the inner annular region is subjected to a subatmospheric pressure through the at least one opening and then the at least one opening is sealed. When the cryogenic fluid is passed through the inner pipe, any remaining amounts of the condensable gas will either liquefy or solidify.

As is apparent from the above description of the present invention, complicated junctions between piping sections are not required. Further, individually evacuated piping sections fabricated for later transport to a construction site and piping sections are not fabricated with many openings and the like that could serve at points at which the vacuum could fail.

The condensable gas can be carbon dioxide and the tracer gas can be helium. Ring-like spacing elements formed of a thermally insulating material can be provided to separate the insulation material and the outer cylindrical casings, thereby to help maintain the concentric arrangement and to allow for differential thermal expansion between the outer cylindrical casings and the inner pipes.

The insulation material can comprise an aerogel. The aerogel can be in the form of blankets comprising the aerogel in a fibrous batting that is wrapped around the inner pipes. Additionally, alternating layers of aluminum or copper foil and paper can be positioned between the blankets and the inner pipes.

Preferably, at least one of the piping sections is produced with a tubular service element projecting from the one of the outer casing sections. The tubular service element is in flow communication with the inner annular region at one end thereof. A plate is positioned upon the opposite end of the tubular service element and a seal is positioned between the plate and the opposite end. The plate is held in position because the outer face is subjected to atmospheric pressure and the inner face is subjected to the subatmospheric pressure within the cylindrical casing sections such that upon a leak in the inner pipes within the piping sections, over pressures within the casing sections can be relieved through the tubular service element. At least one valve is connected to the tubular service element. The valve has an open position to form the at least one opening in the at least one casing section and a closed position to seal the at least one opening. A vacuum pump can be connected to the at least one valve and the at least one valve can be set in an open position during operation of the vacuum pump to evacuate the inner annular region and to subject the inner annular region to the subatmospheric pressure and can thereafter be set in the closed position after cessation of operation of the vacuum pump.

Where the insulation material comprises an aerogel, the vacuum insulated piping run can be evacuated and subjected to the subatmospheric pressure through a filter positioned within the tubular service element and in communication with the at least one valve to prevent particles of the aerogel from being drawn into the vacuum pump.

The at least one of the outer casing sections can be formed by connecting a piping tee to an outer pipe such that a central section of the piping tee forms the tubular service element. Additionally, the one of the outer casing sections can further comprise a tubular bellows interposed between the piping tee and the outer pipe, thereby to connect the piping tee to the outer pipe.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
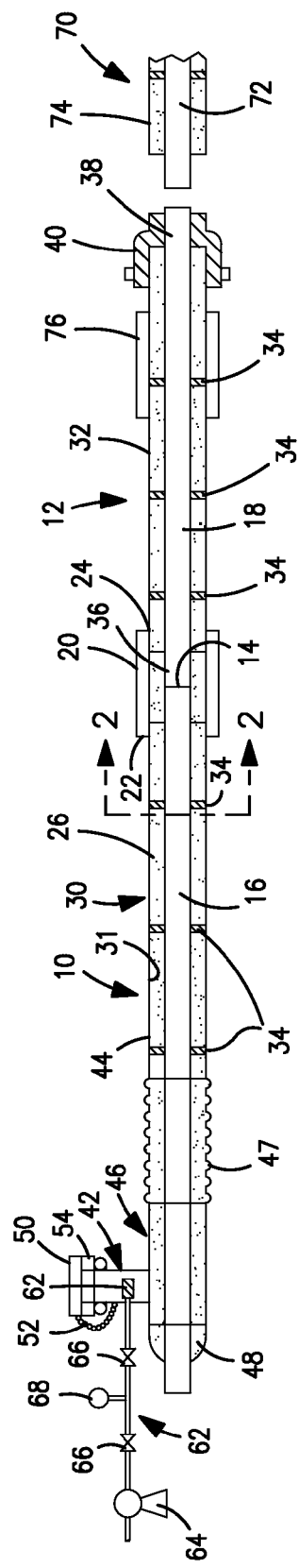
FIG. 1 is a schematic, sectional view of a method for carrying out the present invention in which a piping section of the present invention is being subjected to a vacuum leak test.
Figure 2:
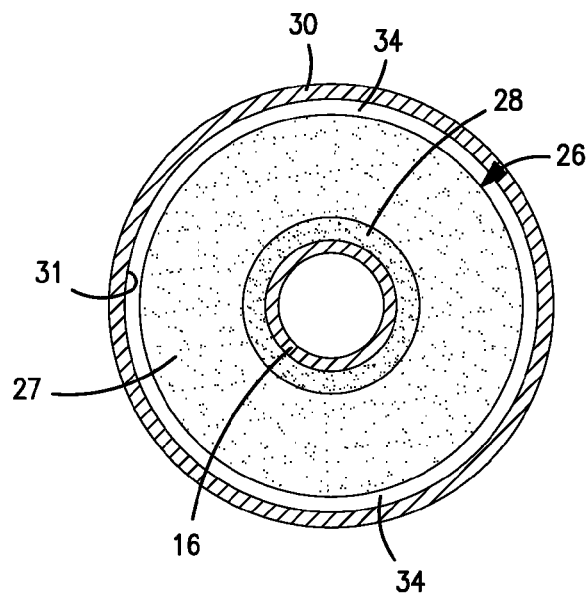
FIG. 2 is a sectional view of FIG. 1 taken along line 2-2 of FIG. 1.

With reference to FIGS. 1 and 2, the method in accordance with the present invention is illustrated in which piping sections 10 and 12 have been joined in a juncture 14 of inner pipes 16 and 18 and a connection between a shell-like section 20 formed by a sleeve-like element at circumferential locations, generally designated by reference numerals 22 and 24 is being tested by a helium vacuum leak test.

Each of the sections 16 and 18 is provided with an inner pipe, for example, inner pipe 16 through which cryogenic fluid will be transported. In order to prevent heat leakage into the inner pipes, insulation material 26 is provided that can be formed of an aerogel blanket-type material 27 and an optional inner radiation barrier 28 or other insulation materials suitable for vacuum service.

Surrounding insulation material 28 are outer cylindrical casings, such as outer cylindrical casing 30 or piping section 10 and outer cylindrical casing 32 for piping section 12. The outer cylindrical casings, such as outer cylindrical casing 30, for example, can be formed by a pipe having a greater diameter than the inner pipes, for example, inner pipe 16 to form an inner annular region 31 between the outer cylindrical casing and the inner pipe 16 to contain the insulation material 26. The concentric arrangement of inner pipes 16, insulation material provided by radiation shield 26 and aerogel insulation 28 and the outer cylindrical casings, for example, outer cylindrical casing 30, can optionally helped to be maintained in the concentric arrangement by ring-like or square spacer elements 34 or spacer elements of other configuration. The spacer elements are formed of solid glass fibre-filled phenolic resin or other thermally insulating material to limit heat transfer from the outer cylindrical casings to the inner pipes. Such ring-like spacer elements 34 can be obtained from Norplex-Micarta of Postville, Iowa, USA. Other suitable ring-like structures can be used. It is to be noted that ring-like spacer elements 34 not only maintain the concentric arrangement but also allow for differential expansion of the inner piping sections 16 and 18 and the outer cylindrical casing sections 30 and 32.

Each of the piping sections can be formed in an off-site location and then transported and assembled at the location in which the finished piping run is to be employed. Each of the piping sections 30 and 32 and etc. are formed by first wrapping inner pipes 16 and 18 with the radiation barrier 28 that can consist of alternating layers of thin metal foil (copper or aluminum) and a paper layer with very low thermal conductivities. These foils are known as multi-layer insulation or super insulation. Typically, anywhere from 4 to 32 layers are required. The number of layers will depend on the particular type of cryogenic fluid to be piped within the finished piping run. As can be appreciated by those skilled in the art, more layers are required for cooler fluids such as hydrogen or helium as compared with comparatively warmer fluids such as nitrogen because the radiation flux is higher due to the larger temperature difference between the inner pipers 16 and 18 and the outer cylindrical casings 30 and 32. A suitable radiation barrier material can be obtained from Lydall Corporation, Manchester, Conn. 06042-2378.

After the inner pipes 16 and 18 are wrapped, anywhere from 1 to 3 wraps of aerogel in a blanket form containing aerogel in a fibrous batting are wrapped around the radiation shield 28 to form the aerogel insulation 27. Suitable aerogel blankets can be obtained from Aspen Aerogels, Inc. of North Burrough, Mass. 01532, USA. Although not illustrated, the aerogel blankets can be held in position by providing ties of copper wires or the like wrapped around the aerogel blanket. The outer casings 30 and 32 are then slid over the inner pipes 16 and 18 with radiation barrier 28, aerogel insulation 27 and ring-like spacer element 34 in place.

As illustrated, the outer cylindrical casings such as outer cylindrical casing 32, for example, are shorter than the inner pipes such as inner pipe 18. As such, once each of the piping sections 12 and 10 are assembled, opposite ends 36 and 38 protrude from the outer cylindrical casings such as outer cylindrical casing 32. Attached to these protruding ends 36 and 38 are rubber boots. The rubber boots are provided to prevent dust and moisture from entering the annular region 31 between inner pipes 16 and 18 and outer cylindrical casings 30 and 32 and therefore, the aerogel insulation 28. Such a rubber boot is illustrated by rubber boot 40 that will be discussed in more detail hereinafter.

Figure 3:
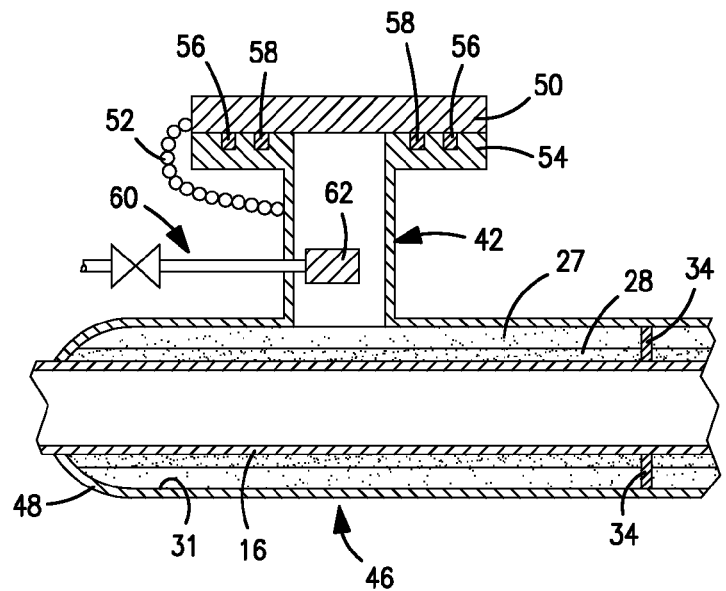
FIG. 3 is an enlarged, fragmentary sectional view of FIG. 1 illustrating a piping tee in forming a tubular service element of the present invention.

With reference to FIG. 3, piping section 10 is provided with a tubular service element 42 that is formed by fabricating the outer casing section 30 from an outer pipe 44 and a piping tee 46. As could be appreciated, a cylindrical element could simply be connected to an outer cylindrical casing and an opening formed in the outer cylindrical casing. As illustrated, the central section of the piping tee 46 forms the tubular service element 42. The piping tee 46 is connected to outer pipe 44 by way of a tubular bellows 47 to allow for expansion and contraction of the outer casing sections. Tubular bellows 47 is optional for such purposes. However, other outer casing sections could incorporate such a bellows at intermediate locations of the piping run. At the end of the piping run, a flow reducer 48 can be provided to seal the annular region 31 between the inner pipes 16 and 18 and the outer casing sections 30 and 32. Although not illustrated, when completed, the other end of the piping run can be finished with flow reducer of the same design as flow reducer 48. Other methods such as an annular plate could be used for such purposes.

A plate 50 is attached to tubular service element 42 by way of a chain 52. Plate 50 rests upon a flange 54 divided with o-rings 56 and 58 to form a seal between plate 50 and flange 54.

The tubular service element 42 allows the connection between piping sections 16 and 18 to be leak tested by evacuating the annular region 31 between the inner pipes 16 and 18 and the outer casing sections 30 and 32 and thereafter for a subatmospheric pressure to be applied to such space after the piping run is completed to form a near vacuum in the insulation material 26. In this regard, prior to forming the vacuum a condensable gas, for example, carbon dioxide can be introduced into such annular region 31 by tubular service element 42 to discharge any air and moisture within such annular region 31 and thereafter to be drawn out of such space. Any remaining condensable gas will be liquefied or solidified upon cryogenic fluid passing within inner pipes 16 and 18. For such purposes, a conduit 60 projects into tubular service element 42 and where the insulation 28 can produce unwanted particulates, a filter 62 can be connected to conduit 60 to trap any particulates that may be present during such operations particularly in the case when aerogel insulation is used. A suitable filter would be constructed of sintered bronze with an average pore size of 50 microns. Conduit 62 is connected to a vacuum pump 64.

Conduit 62 can be provided with one or more cut-off valves 66 having an open position to allow vacuum pump 64 to exert the subatmospheric or below atmospheric pressure within the annular region 31 and in addition can also be provided with a vacuum gauge 68 to measure the pressure.

After the piping sections 30, 32 and etc. are fabricated and connected, they are leak tested by, for example, helium leak testing methods known in the art to make certain all welds may be incorporated into the piping sections are gas tight. This is required for the welds at flow reducer 48 and at opposite ends of bellows 47. Thereafter, the rubber boots 40 are applied and the piping sections are ready for shipment to the site at which assembly of the piping run will take place.

As stated previously, the present invention advantageously allows the sections to be assembled on site and vacuum to be applied. In order to accomplish this, sections 30 and 32 and the ends of pipes 16 and 18 that protrude from the outer cylindrical casings 30 and 32, for instance, protruding section 36 of inner pipe 18. A solvent can be used to clean the pipe ends of both the internal and external pipe. The resultant juncture 14 is required by local pressure vessel and piping codes can be tested by known radiographic techniques. Preferably, although perhaps not necessary for all installations, at the juncture 14 the inner pipe can again be wrapped with inner radiation shield 28 and outer layers of aerogel blanket insulation 27 as has been described above.

Thereafter, a shell-like section that can be a sleeve such as shell-like section 20 or perhaps 2 to 4 individual sections of a sleeve or flush-welded piping sections can be employed to seal the outer cylindrical casings at the juncture of the inner pipes for example, outer cylindrical casings 30 and 32 at the juncture 14. The use of a sleeve, sections of a sleeve or pipe sections to be flush welded will depend upon the outer diameter of cylindrical casings 30 and 32. However, sleeves, such as provided by shell-like section 20 are advantageous in that they can be slid into position and then welded circumferentially around at locations 22 and 24. The rubber boot 40 is left on the opposite end of piping section 12. It is to be noted that in addition, all areas that can be affected by the heat of welding can be wrapped with suitable high temperature insulation such as a fiberglass.

Connections of shell-like section 20 and juncture 14 are then leak tested by opening cut-off valves 66 and turning on the vacuum pump 64 until the inner annual region is pumped down to about 1000 microns. Thereafter, a helium leak test can be performed by operating vacuum pump 64 while supplying a helium tracer gas to the inside of inner pipes 16 and 18 and the connections at 22 and 24. The outlet stream of the vacuum pump 64 can then be tested for the presence of helium with the use of a mass spectrometer leak detector. A bag can be placed around shell-like section 20 to conserve helium and one end of the piping run, thus far completed, at rubber boot 40 can be sealed. It is to be noted, that at completion of each junction of inner pipes 14 and the corresponding connections of the shell-like sections, a leak test will be performed since otherwise it would be impossible to know which juncture of inner pipes were leaking. At about the same time the connections of the corresponding shell-like section 20 to outer cylindrical sections 30 and 32 is tested. However, this is not necessary to isolate a leak in such connections and several of such connections of shell-like sections could each be tested after having been made in that it would be apparent which one was leaking. After the leak test the cut-off valves 66 are shut.

It is to be noted that each of the junctures could be leak tested directly after having been formed by optionally, evacuating the inner pipes after having sealed one end, intruding the helium tracer gas to the juncture, prior to adding any insulation and connecting corresponding the shell-like sections, and testing the outlet stream of a vacuum pump used for such purposes for the presence of the helium tracer gas. The connections of the shell-like sections would be tested in the same manner as outlined above.

Once it has been assured that there is no leakage, a further piping section 70 having an inner pipe 72 and an outer cylindrical section 74 can be joined to piping section 12 in the same manner as piping sections 10 and 12. A shell-like section 76 has been placed upon outer cylindrical section 32. The rubber boot 40 would be removed and at the opposite end of piping section 70 a similar rubber boot would be left in place.

The sequence of events, as described above, occurs until the piping run is complete and all junctures such as juncture 14 and connections such as at 22 and 24 have been inspected. Thereafter, cut-off valves 66 are opened again and a condensable gas, such as carbon dioxide is then introduced through conduits 62 to drive out air and any moisture within the annular region 31. This can be done from 3 to 6 times to make certain that all of the air and moisture is flushed out of the system. It is also an advantage to reduce the pressure of the system to around 1000 microns between each of the 3 to 6 introductions of condensable gas, to reduce the residual quantity of air even further. Thereafter, the vacuum pump 64 is turned on to pump down the inner annular region 31 to a subatmospheric pressure, preferably between about 10 and about 1000 microns. Any remaining carbon dioxide will condense and solidify to further decrease the pressure in the inner annular region 31.

As can be appreciated, particularly long piping runs several openings such as provided by tubular service element 42 can be provided along the length of the pipe and several vacuum pumps such as vacuum pump 64 can be used.

While the present invention has been described with reference to a preferred embodiment, as will occur to those skilled in the art, numerous changes and additions and omissions can be made without departing from the spirit and the scope of the present invention as set forth in the presently pending claims.

We claim:

1. A method of assembling a vacuum insulated piping run for conducting a cryogenic fluid, said method comprising:
   producing piping sections in a first location, the piping sections having a concentric arrangement of outer cylindrical casings, inner pipes to conduct the cryogenic fluid and insulation material located between the outer cylindrical casings and the inner pipes;
   transporting said piping sections from the first location to a second location and assembling the piping sections into the vacuum insulated piping run by joining the ends of the inner pipes and then connecting shell-like sections to the outer cylindrical casings at junctures of the inner pipes;
   helium leak testing the junctures of the inner pipes and the connections of the shell-like sections such that at least a helium leak test is performed to determine the integrity of at least each of the junctures after forming each of the junctures and at least each of the connections is helium leak tested by temporarily sealing an inner annular region located between the outer cylindrical casings and the inner pipes and containing the insulation materials, evacuating the inner annular region through at least one opening formed in at least one of the outer cylindrical casings such that a plurality of the junctures and connections can be helium leak tested with the use of the at least one opening, introducing a helium tracer gas to each of the connections to be helium leak tested and testing an outlet stream evacuated through the at least one opening for presence of the helium tracer gas;
   after the vacuum insulated piping run is assembled, introducing a condensable gas into the vacuum insulated piping run, within the inner annular region, through the at least one opening; and
   subjecting the inner annular region to a subatmospheric pressure through the at least one opening and then sealing the at least one opening.

2. The method of claim 1, wherein, each of the junctures is tested by introducing the helium tracer gas into the inner pipes and testing the outlet stream evacuated through the at least one opening for presence of the helium tracer gas.

3. The method of claim 1, wherein the condensable gas is carbon dioxide.

4. The method of claim 1, wherein the piping sections are produced with ring-like spacing elements formed of a thermally insulating material separating the insulation material and the outer cylindrical casings thereby to help maintain the concentric arrangement and to allow for differential thermal expansion between the outer cylindrical casings and the inner pipes.

5. The method of claim 1 or claim 2 or claim 3 or claim 4, wherein the insulation material comprises an aerogel.

6. The method of claim 5, wherein the aerogel is in the form of blankets comprising the aerogel and a fibrous batting that are wrapped around the inner pipes.

7. The method of claim 5, wherein alternating layers of aluminum or copper foil and paper are positioned between the aerogel; and the inner pipes.

8. The method of claim 1, wherein:
   at least one of the piping sections is produced with a tubular service element projecting from the at least one of the outer casings, in flow communication with the inner annular region at one end of the tubular service element, a plate positioned upon the opposite end of said tubular service element and a seal between the plate and the opposite end, the plate being held in position by the subatmospheric pressure within the outer cylindrical casings such that upon a leak in the piping sections, over pressures within the outer casings can be relieved through the tubular service element;
   at least one valve is connected to the tubular service element having an open position to form the at least one opening in the at least one of the outer casings and a closed position to seal the at least one opening; and
   a vacuum pump is connected to the at least one valve, the at least one valve is to be set in the open position during operation of the vacuum pump to evacuate the inner annular region and to subject the inner annular region to the subatmospheric pressure and the closed position after cessation of operation of the vacuum pump.

9. The method of claim 8 wherein:
   the insulation material comprises an aerogel; and
   the vacuum insulated piping run is evacuated and subjected to the subatmospheric pressure through a filter positioned within the tubular service element and in communication with the at least one valve to prevent particles of the aerogel from being drawn into the vacuum pump.

10. The method of claim 9, wherein the condensable gas is carbon dioxide.

11. The method of claim 10, wherein the aerogel is in the form of blankets comprising the aerogel and a fibrous batting that are wrapped around the inner pipes.

12. The method of claim 10, wherein alternating layers of aluminum or copper foil and paper are positioned between the aerogel and the inner pipes.

13. The method of claim 9, wherein the at least one of the outer casing sections is formed by connecting a piping tee to an outer pipe such that a central section of the piping tee forms the tubular service element.

14. The method of claim 13, wherein one of the outer casing sections further comprises a tubular bellows interposed between the piping tee and the outer pipe, thereby to connect the piping tee to the outer pipe.

* * * * *